Figure 1:
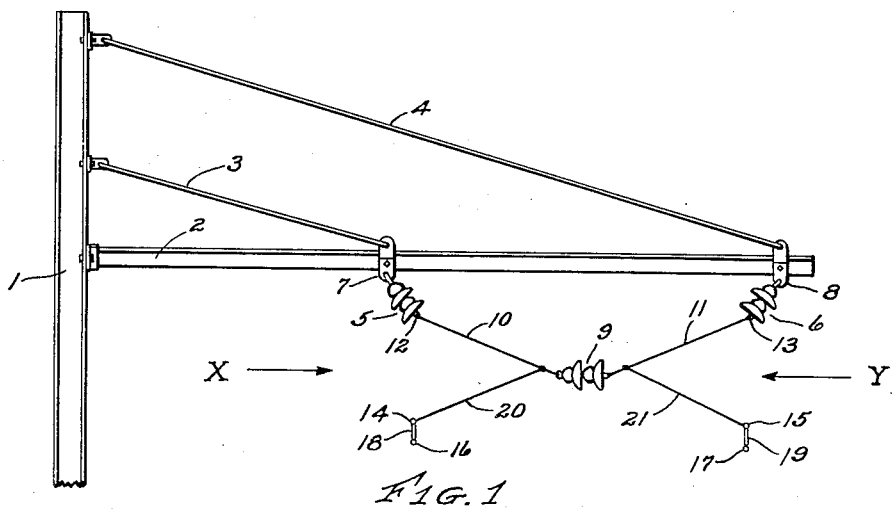

Inventor
LELAND W. BIRCH
By
Attorney

Feb. 17, 1948.   L. W. BIRCH   2,436,089
STEADYING MEANS FOR CATENARY TROLLEY SYSTEMS
Filed Dec. 29, 1945   2 Sheets-Sheet 2

INVENTOR.
LELAND W. BIRCH.
BY

Patented Feb. 17, 1948

2,436,089

UNITED STATES PATENT OFFICE 2,436,089

STEADYING MEANS FOR CATENARY TROLLEY SYSTEMS

Leland W. Birch, Mansfield, Ohio, assignor to The Ohio Brass Company, Mansfield, Ohio, a corporation of New Jersey Application December 29, 1945, Serial No. 638,124

9 Claims. (Cl. 191—41)

My invention relates to catenary trolley systems and particularly to a steady to prevent the lateral swaying of the trolley or contact wires.

It has been found advantageous and also economical when two contact wires are employed, each supported by its own catenary supports, to employ one steady which will be common to the two contact wires and their support wires.

These steadies are positioned as a rule at a support for the system in vertical and transverse alignment therewith. Should the systems include three spaced parallel trolley wires then there would be a steady between the central trolley wire and its supporting wires and each of the two outer trolley wires and their supporting wires.

In the accompanying drawing I have shown the embodyment of the invention I now deem preferable, but it will be understood that the drawing is intended for illustrative purposes only and is not to be construed as defining or limiting the scope of the invention, the claims forming a part of this specification being relied upon for that purpose.

In Fig. 1 is shown schematically on a reduced scale a steady for two trolley or contact wires in which the insulators are of the underhung type.

Figure 2:
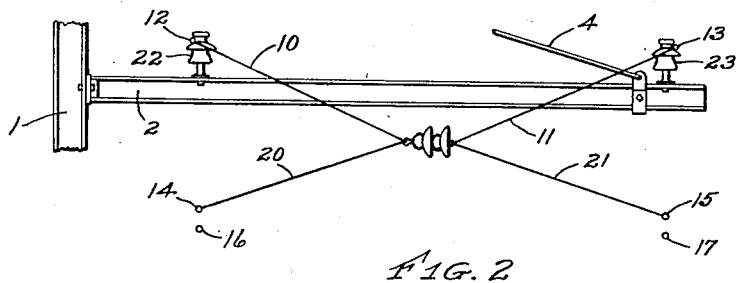

In Fig. 2 is shown schematically on a reduced scale a steady for two trolley or contact wires in which the insulators are of the pin type supported above the arm.

Figure 3:
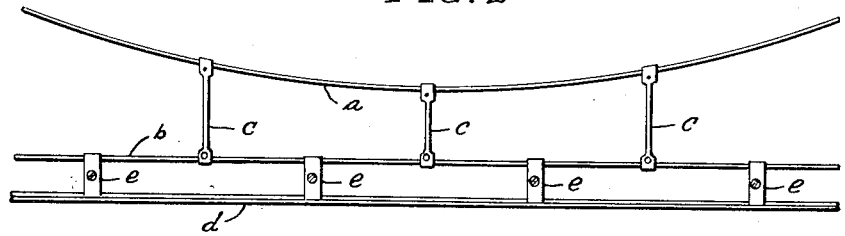

In Fig. 3 is shown a portion of a span of a catenary system between supports in one of its simpler constructions.

Figures 4, 5:
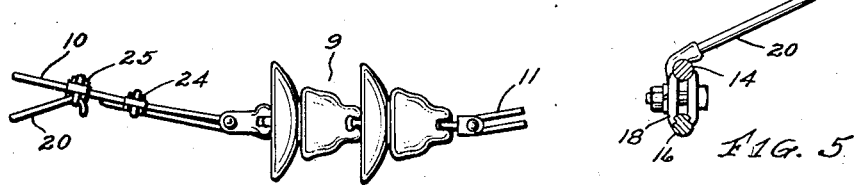

In Fig. 4 is shown an enlarged portion of the steadies shown in Fig. 1.

In Fig. 5 is shown a fitting for convenient use in connecting the steady to the trolley and intermediate wires.

Figure 6:
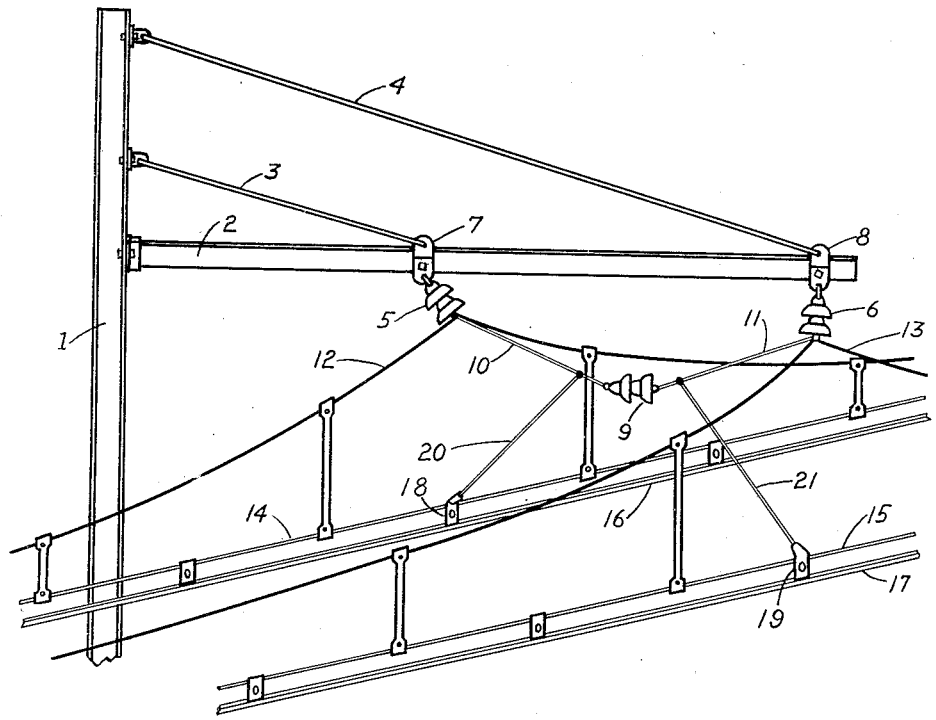
Figure 7:
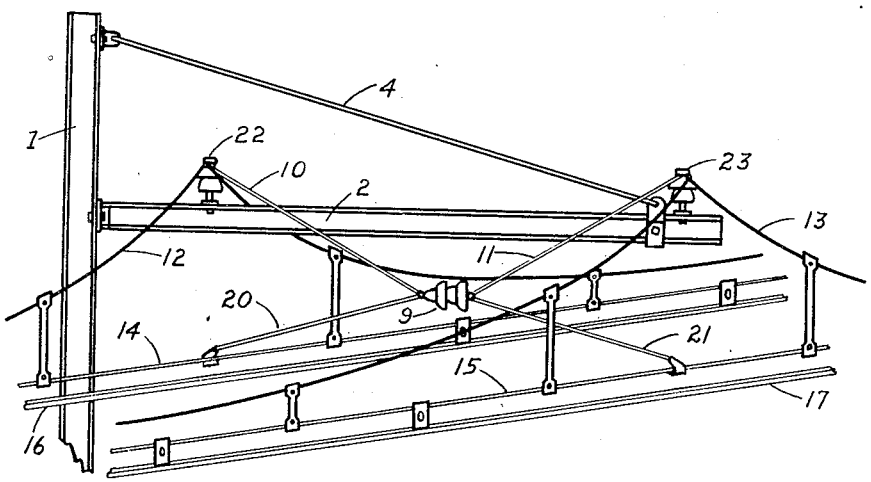

Figs. 6 and 7 are perspectives of Figs. 1 and 2 respectively.

In Fig. 3, the catenary cable 12—13 is supported at the ends of the span by insulators shown in Figs. 1 and 2, and in turn supports an intermediate wire 14—15 by means of hangers c. The trolley or contact wire 16—17 which is engaged by the passing current collectors is suspended from the intermediate wire 14—15 by clips e. In a simpler well known catenary system the intermediate wire 14—15 and clips e would be eliminated and the trolley wire 16—17 would be suspended directly from the catenary cable 12—13 by the hangers c.

The systems represented by Figs. 1 and 2 including a pair of longitudinal spans shown in Fig. 3, each span comprising a catenary cable supporting an intermediate wire from which is suspended the contact wire by clips e.

In the embodiment shown in Fig. 1, the support 1 has a projecting arm 2 and braces 3 and 4. Suspended below the arm 2 by means of fittings 7 and 8 are spaced insulators 5 and 6 of the suspension type.

Intermediate the insulators 5 and 6 and in a vertical but lower plane therewith is steady insulator 9, which is supported by insulators 5 and 6, by means of cross-spans 10 and 11 respectively.

The spans 10 and 11 are preferably cables and therefore flexible but may be rods.

The insulators 5, 6 and 9 are shown as having two units each but any number of units may be used depending upon the rating of the unit and the voltage on the system.

The insulators 6 and 5 protect the trolley wires from leakage to ground while the insulator 9 maintains an insulated relation between the trolley systems. The steady insulator 9 is necessary where it is demanded that the trolley systems be segregated or insulated from each other.

Also attached to the lower end of the insulators 5 and 6 are extended lengths of messenger cables 12 and 13 and suspended below the messenger cables by hangers corresponding to hangers C (Fig. 3) are intermediate wires 14 and 15, and extended lengths of contact or trolley wires 16 and 17 are suspended below the intermediate wires 14 and 15 respectively by steady clips 18 and 19 (Fig. 5) positioned in vertical alignment below the supporting insulators and by clips corresponding to clips e (Fig. 3) at other points.

Attached to each cross-span adjacent the insulator 9 and to the contact means are rods 20 and 21 respectively.

The cross-spans 10 and 11 may be attached to the lower end of the insulators 5 and 6 respectively or to the messenger cables 12 and 13 adjacent to the insulators 5 and 6 respectively.

The term "contact means" used herein and in some claims is intended to define not only the trolley or contact wire 16 or 17 taken alone but also the combination of the contact wire and its associated intermediate wire.

In Fig 2, those parts which correspond to those in Fig. 1 are indicated by the same numerals. The principal differences in Figs. 1 and 2 are found in the insulators 22 and 23 which are of the pin type and mounted above the member 2 and, the rods 20 and 21 are shown as each having one end attached to the terminals of the insulator 9 in place of to the spans 10 and 11 adjacent the insulator terminals and the other end associated only with the intermediate wire as the clips 18 and 19 are omitted. The operation of the two steadies is the same in both Figs. 1 and 2.

In Fig. 1 the insulators 5 and 6 are shown as set at an angle approaching that of the cross-spans 10 and 11; this feature is incorporated in the system at the time of construction.

By using strand or cable for the members 10 and 11 (Fig. 4) it is an easy matter to adjust the same relative to the insulators by means of the clamps 24 also in Fig. 1 where the rods 20 and 21 are attached to the cross-spans 10 and 11, the relation therebetween may be readily altered by means of the clamps 25.

The operation of the steady in both Figs. 1 and 2 is the same namely, when the wind blows in the direction X, steady arm 20 pushes against cross-span 10 (Fig. 1) or insulator 9 (Fig. 2). The tension in cross-span 10 is carried to insulator 5 (Fig. 1) and insulator 22 (Fig. 2) and a retarding effect is produced in trolley wire 16 and intermediate wire 14.

Also the wind blowing in the direction X against the intermediate and trolley wires 15 and 17, steady arm 21 pulls on the cross-span 11 (Fig. 1) or insulator 9 (Fig. 2) and which stress is transmitted to insulator 5 (Fig. 1) and insulator 22 (Fig. 2) through cross-span 10.

When the wind blows in the direction Y against the intermediate and trolley wires in the case of both Figs. 1 and 2, the action of the steady is the same as described above for Fig. 1 except the stress is taken up by insulators 6 and 23.

It will be apparent that a number of variations in the combinations shown in Figs. 1 and 2 may result from the several disclosures made herein.

The clip shown in Fig. 5 may be used on a system in which the contact wires or means 16 and 17 are hung directly from the messenger cables. The steady will operate the same on such a system as in case of Figs. 1 and 2, also to steady two contact wires suspended from a single intermediate wire as disclosed in U. S. Patent 1,643,209.

Having described my invention, I claim:

1. In a support for a pair of catenary trolley systems held in laterally spaced relation and each system including a messenger cable and an intermediate wire and a trolley wire as described; in combination a supporting structure and a pair of supporting insulators held by the support in spaced relation and each insulator adapted to receive and support one of the messenger cables of the catenary systems, a steady arranged to be interposed between the systems to prevent side sway thereof, the steady comprising a steady insulator positioned intermediate and below the supporting insulators, cross-spans extending from the steady insulator to the supporting insulators and a rod extending from the steady insulator to each catenary system and means on an end of each rod adapted to connect to an intermediate wire.

2. In a supporting structure for a pair of spaced catenary trolley systems each including a messenger cable and an intermediate wire and a trolley wire suspended therefrom; the combination of a support and a pair of spaced insulators held by the support and adapted to receive and hold the messenger cables of the systems in spaced and insulated relation, a steady insulator positioned substantially midway of and below the spaced insulators and provided with cross-spans arranged to be connected with the messenger cables, and steady rods associated with the steady insulator and each end provided with means arranged to connect to the intermediate wires.

3. A supporting structure for a pair of spaced catenary systems each including a messenger cable and conductor means suspended from each messenger cable; the supporting structure comprising, a support, a pair of spaced supporting insulators held by the support, steady means arranged to be interposed between the catenary systems, the steady means comprising a central insulator secured to each supporting insulator by a cross-span and adapted to be secured to each conductor means by a steady rod, each rod provided with means at one end to connect the rod to an adjacent cross-span adjacent the central insulator whereby the steady rod may be adjusted relative to the central insulator and means at the other end of the rods adapted to connect the rods to the conductor means respectively.

4. A supporting structure for a pair of spaced catenary trolley systems each including a messenger cable and contact means suspended from the messenger cable; the combination of, a support, a pair of under-hung insulators attached to the support in spaced relation each adapted to receive and hold a messenger cable, the longitudinal axis of the insulators angled inward and downward, steady means including a third insulator so arranged as to be interposed between the catenary systems, the steady means comprising stress members extending from each underhung insulator to the diagonally opposite contact means and including the said third insulator to maintain the contact means insulated from one another, the said stress members being inclined in the same direction as the underhung insulators to which they are attached and means on the other ends of the stress members arranged to attach the stress members to the contact means.

5. A supporting and steadying structure for a pair of spaced catenary trolley systems, each system including a messenger cable and a trolley wire suspended below the messenger cable; the combination of a support, a pair of supporting insulators secured to the support in spaced relation and each insulator adapted to support one of the catenary systems, steady means including a third insulator arranged to prevent the side sway of the catenary systems, the steady means comprising a plurality of stress members arranged to extend between each messenger cable and the diagonally opposite trolley wire including the third insulator so associated with the stress members as to maintain the systems in insulated relation.

6. A supporting and steadying structure for a pair of catenary trolley systems each including a messenger cable and contact means suspended therefrom; comprising, a support, a pair of spaced insulators secured to the support and each insulator adapted to support one of the messenger cables, steady means to prevent swaying of the contact means, the steady means comprising a plurality of obliquely disposed stress members extending between the catenary systems and having means adapted to attach the stress members thereto and a centrally disposed insulator through which the stress members act.

7. A support and steadying structure for a pair of spaced catenary trolley systems each including a messenger cable and contact means suspended from the messenger cable; in combination, a support, a pair of spaced insulators each arranged to support one of the systems, steady means to prevent side sway of the systems due to wind pressure, the steady means comprising a plurality of obliquely disposed stress members so constructed and arranged relative to each other and to the caternary systems that side stress in the same direction in both systems will be taken by one insulator and an insulator interposed between the stress members to maintain the two catenary systems in insulated relation.

8. A support and steadying structure for a pair of spaced catenary trolley systems each including a messenger cable and contact means suspended therefrom; in combination, a transversely disposed support, a pair of insulators secured to the support and each insulator adapted to receive one of the systems, steady means positioned between the insulators to resist side sway of the contact means, the steady means comprising a pair of flexible members extending downwardly and inwardly and each having one end supported by one of the insulators and the other end of each flexible member connected to an insulator to maintain the flexible members in insulated relation and a rigid stress member extending downwardly and outwardly from the last said insulator and each having means at its lower end adapted to receive one of the contact means whereby side movement of the contact means is resisted by one of the said pair of insulators.

9. A steady structure for a pair of laterally spaced catenary systems and each system including a supported messenger cable and a contact member suspended therefrom; in combination, a support including a horizontal member, a pair of insulators supported by the arm in spaced relation, a pair of inwardly and downwardly disposed cross-spans having one end connected to the said insulators and a steady insulator to which the inner ends of the cross-spans are secured in insulated relation to one another, inwardly and upwardly disposed stress members having their inner ends associated with the steady insulator in insulated relation to one another and the outer ends provided with means arranged for attachment to the contact means respectively to prevent swaying of the contact means.

LELAND W. BIRCH.

REFERENCES CITED

The following references are of record in the file of this patent:

UNITED STATES PATENTS

| Number | Name | Date |
|---|---|---|
| 1,035,045 | Pforr | Aug. 6, 1912 |
| 1,292,238 | Bolus | Jan. 21, 1919 |
| 1,497,047 | Viele et al. | June 10, 1924 |

FOREIGN PATENTS

| Number | Country | Date |
|---|---|---|
| 299,327 | Germany | Nov. 9, 1915 |
| 581,537 | France | May 10, 1924 |